July 13, 1943.    H. S. PAGE    2,324,319
DYNAMO-ELECTRIC MACHINE
Filed Aug. 13, 1942

Inventor:
Harry S. Page,
by Harry E. Dunham
His Attorney.

Patented July 13, 1943

2,324,319

UNITED STATES PATENT OFFICE 2,324,319

DYNAMOELECTRIC MACHINE

Harry S. Page, Schenectady, N. Y., assignor to General Electric Company, a corporation of New York Application August 13, 1942, Serial No. 454,633

7 Claims. (Cl. 171—312)

My invention relates to dynamo-electric machines and more particularly to an arrangement of the excitation system of such a machine to provide a series component of excitation to the main pole pieces of the machine without providing any series field exciting windings.

An object of my invention is to provide an improved dynamo-electric machine wherein a component of series excitation is provided to the machine by the conductors which form the connections for the commutating field exciting windings of the machine.

Another object of my invention is to provide an improved excitation member for a dynamo-electric machine wherein connection conductors for commutating field exciting windings are arranged to provide a net part-turn component of series excitation to the main pole pieces of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
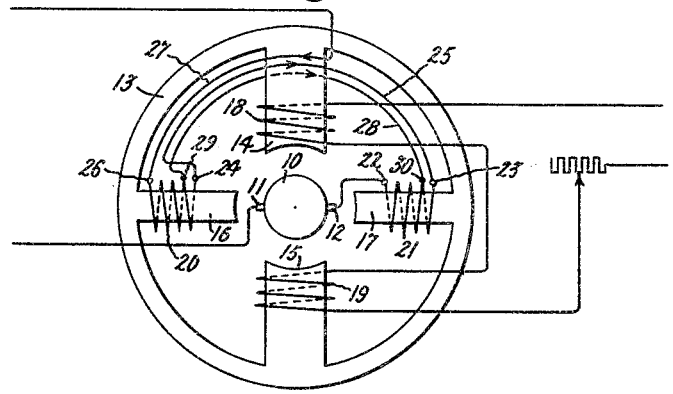
Figure 2:
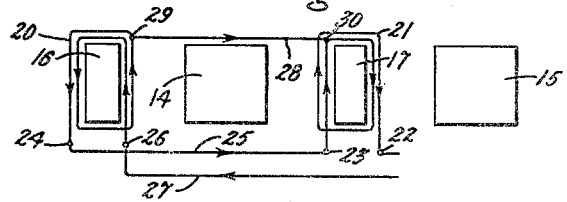
Figure 3:
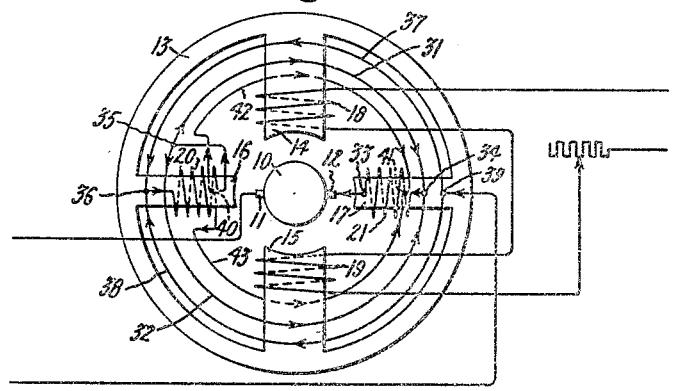

In the drawing, Fig. 1 is a schematic illustration of a dynamo-electric machine provided with an embodiment of my invention wherein the series component of excitation is provided to only a part of the main pole pieces; Fig. 2 is a developmental view of the machine shown in Fig. 1 illustrating the connections of the commutating field exciting windings; Fig. 3 is a schematic diagram of a dynamo-electric machine provided with another embodiment of my invention; and Fig. 4 is a developmental view of the machine shown in Fig. 3 illustrating the connections of the commutating field exciting windings thereof.

Referring to the drawing, I have shown in Figs. 1 and 2 a dynamo-electric machine provided with a rotatable member or armature 10 having a suitable winding connected to a commutator with which commutator brushes 11 and 12 form an electrical contact. The machine is provided with an excitation system which includes a stationary member frame 13 provided with main pole pieces 14 and 15 and commutating pole pieces 16 and 17 arranged intermediate the main pole pieces. The main component of excitation of the machine is provided by main field exciting windings 18 and 19 arranged on the main pole pieces 14 and 15 and adapted to be connected to any suitable source of electrical power supply. In order to improve the commutation of the machine, the commutating pole pieces 16 and 17 are provided with commutating field exciting windings 20 and 21, respectively, which are arranged to be energized by the armature current. One terminal 22 of the field exciting winding 21 is connected to the commutator brush 12, and the other terminal 23 thereof is connected to a terminal 24 of the other field exciting winding 20 by an electrical conductor 25 to provide a series electrical connection between the commutating field exciting windings. The other terminal 26 of the commutating field exciting winding 20 is adapted to be connected to the load terminal of the machine by an electrical conductor 27. A tap is provided on each of the commutating field exciting windings 20 and 21 for corresponding portions of these windings less than the whole windings, thereby dividing these windings into sets of proportionate turns. An electrical conductor 28 is arranged to connect together the taps 29 and 30 of the commutating field exciting windings 20 and 21, thereby connecting together portions of the commutating field exciting windings on different pole pieces and shunting a certain predetermined portion of the series or armature current through this tap connector 28. The commutating field exciting winding terminal connectors 25 and 27 are arranged on the same transverse side of the main pole piece 14 and the tap connecting conductor 28 is arranged on the other transverse side of the main pole piece 14. With this arrangement, the commutating field exciting winding terminal connecting conductors will carry current in opposite directions across one side of the main pole piece 14, and the tap connecting conductor 28 will carry current in the same direction relative to the main pole piece as current in one of the terminal connecting conductors. The current carried by the tap connecting conductor 28 will be equal to the difference between the currents carried by the terminal connecting conductors 25 and 27, and since the current in the conductor 28 will flow in the opposite direction from the current in the conductor 27 on the opposite side of the main pole piece, and which carries the total current of the commutating field exciting windings, the excitation provided by the current in the conductor 28 will be in the same direction as the excitation provided by the difference in the current carried by the conductor 27 and that carried by the conductor 25, thus providing either a cumulative or differential series excitation to the main pole piece 14 as may be desired. Since this excitation is equal only to the proportionate amount of current carried by the tap connecting conductor 28, the net series excitation provided to the main pole piece 14 of the machine is only a part-turn component of excitation. Arrows are shown on the connections indicating the relative direction of current flow. The fractional-turn series component of excitation can be varied by varying the turns connected by the tap connecting conductor 28 in a manner similar to the variation in the voltage obtainable in a conventional potentiometer. Furthermore, the series characteristic of the machine can be controlled to a certain extent by making the tap connecting conductor 28 of a predetermined resistance and of a material having a predetermined current-resistance or voltage-resistance characteristic to provide an increase or decrease in the proportion of the series excitation depending upon the current or voltage of the machine as may be desired.

Figure 4:
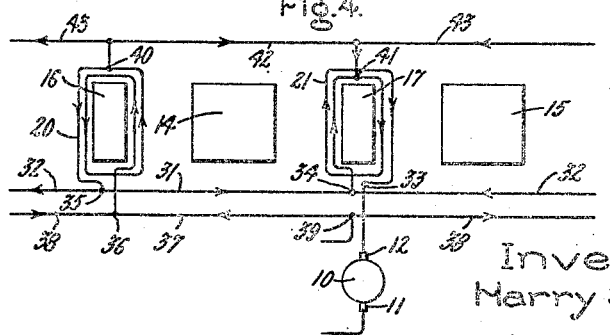

Figs. 3 and 4 illustrate another embodiment of my invention wherein the dynamo-electric machine is provided with the same general elements as those shown in Figs. 1 and 2 and includes a rotatable member or armature 10 provided with a commutator and brushes 11 and 12 arranged within a stationary member having a magnet frame 13 and main pole pieces 14 and 15. The main pole pieces are provided with a main component of excitation by field exciting windings 18 and 19 which may be energized by any suitable source of electrical power supply. Commutating pole pieces 16 and 17 are arranged intermediate the main pole pieces to improve the commutation of the machine and are provided with commutating field exciting windings 20 and 21 which are connected in series by conductors 31 and 32. One terminal 33 of the commutating field exciting winding 21 is connected to the commutator brush 12, and the other terminal 34 thereof is connected in series by the conductors 31 and 32 with a terminal 35 of the field exciting winding 20. The other terminal 36 of the field exciting winding 20 is connected by conductors 37 and 38 to a terminal 39 which forms a line terminal of the machine and is adapted to be connected to the load of the machine or to the source of electrical power supply across which the machine is connected if the machine operates as a generator or a motor, respectively. As in the arrangement shown in Figs. 1 and 2, the commutating field exciting windings 20 and 21 are provided with taps 40 and 41 arranged intermediate the ends of the field exciting windings 20 and 21, respectively, and these taps 40 and 41 are connected together by conductors 42 and 43 to provide an interconnection between corresponding portions of the field exciting windings 20 and 21. The terminal connecting conductors 31 and 32 and 37 and 38 are arranged on one transverse side of the main pole pieces, and the tap connecting conductors 42 and 43 are arranged on the other transverse side of the main pole pieces. As in the arrangement shown in Figs. 1 and 2, the tap connecting conductors 42 and 43 are arranged to carry current in the same direction as the series terminal connecting conductors 31 and 32, and since the conductors 31 and 32 carry current in a direction opposite to the current in the line terminal connecting conductors 37 and 38, the tap conductor provides a component of series excitation to the main pole pieces substantially equal and in the same direction as the difference in the components of excitation provided by the terminal connecting conductors, and a net part-turn component of series excitation is provided to the main pole pieces. Arrows are shown indicating the relative directions of current flow in the connections. As explained with respect to the other figures, the proportion or percentage of part-turn series excitation provided by the commutating field exciting winding commutating connecting conductors can be varied by varying the portion of the windings which are interconnected by the tap connector, as in a conventional potentiometer or transformer, and the series characteristics provided by these tap connecting conductors can be varied as desired by providing the desired resistance characteristic to the conductor.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamo-electric machine having a rotatable member and a stationary member, main pole pieces on said stationary member, commutating pole pieces arranged intermediate said main pole pieces, commutating field exciting windings on said commutating pole pieces, means including conductors for connecting said commutating field exciting windings together and to a source of electrical power supply extending about both transverse sides of said main pole pieces with a conductor connecting together portions of said commutating field exciting windings on different pole pieces and arranged about one of the transverse sides of said main pole pieces for providing a net part-turn component of series excitation to said main pole pieces.

2. An excitation member for a dynamo-electric machine including main pole pieces and commutating pole pieces arranged intermediate said main pole pieces, commutating field exciting windings on said commutating pole pieces, means including conductors for connecting said commutating field exciting windings in series and other conductors for connecting said commutating field exciting windings to a source of electrical power supply extending about one side of said main pole piece arranged to carry current in opposite directions, and means including a conductor connecting together portions of said commutating field exciting windings on different pole pieces and arranged about another side of said main pole pieces to carry current in the same direction as one of said other conductors for providing a net part-turn component of series excitation to said main pole pieces.

3. An excitation member for a dynamo-electric machine including main pole pieces and commutating pole pieces arranged intermediate said main pole pieces, commutating field exciting windings on said commutating pole pieces, means including conductors for connecting said commutating field exciting windings in series and other conductors for connecting said commutating field exciting windings to a source of electrical power supply extending about one side of said main pole piece arranged to carry current in opposite directions, and means including a conductor connecting together corresponding portions of said commutating field exciting windings less than whole windings on different pole pieces and arranged about another side of said main pole pieces to carry current in the same direction as one of said other conductors for providing a net part-turn component of series excitation to said main pole pieces.

4. A dynamo-electric machine having a rotatable member and a stationary member, main pole pieces on said stationary member, commutating pole pieces arranged intermediate said main pole pieces, commutating field exciting windings on said commutating pole pieces, means including conductors for connecting said commutating field exciting windings in series and to a source of electrical power supply extending about one transverse side of said main pole pieces for carrying current in opposite directions with a conductor of predetermined resistance connecting together portions of said commutating field exciting windings less than the whole windings and arranged about the other transverse side of said main pole pieces for carrying current in the same direction as said conductor connecting together said commutating field exciting windings for providing a net part-turn component of series excitation to said main pole pieces.

5. A dynamo-electric machine having a rotatable member and a stationary member, main pole pieces on said stationary member, commutating pole pieces arranged intermediate said main pole pieces, commutating field exciting windings on said commutating pole pieces, means including conductors for connecting said commutating field exciting windings in series and other conductors for connecting said commutating field exciting windings to a source of electrical power supply extending about one transverse side of said main pole pieces arranged to carry current in opposite directions, and means including a conductor connecting together portions of said commutating field exciting windings on different pole pieces and arranged about another side of said main pole pieces arranged to carry current in the same direction as one of said other conductors for providing a net part-turn component of series excitation to said main pole pieces.

6. A dynamo-electric machine having a rotatable member and a stationary member, main pole pieces on said stationary member, commutating pole pieces arranged intermediate said main pole pieces, commutating field exciting windings on said commutating pole pieces, means including conductors for connecting said commutating field exciting windings in series and to a source of electrical power supply extending about one transverse side of said main pole pieces arranged to carry current in opposite directions, and means including a conductor connecting together portions of said commutating field exciting windings and arranged about the transverse side of said main pole pieces arranged to carry current in the same direction as said conductor connecting together said commutating field exciting windings for providing a net part-turn component of series excitation to said main pole pieces.

7. A dynamo-electric machine having a rotatable member and a stationary member, main pole pieces on said stationary member, commutating pole pieces arranged intermediate said main pole pieces, commutating field exciting windings on said commutating pole pieces, means including conductors for connecting said commutating field exciting windings in series and other conductors for connecting said commutating field exciting windings to a source of electrical power supply extending about one transverse side of said main pole piece arranged to carry current in opposite directions, and means including a conductor connecting together portions of said commutating field exciting windings less than whole windings on different pole pieces and arranged about the other transverse side of said main pole pieces arranged to carry current in the same direction as said conductor connecting together said commutating field exciting windings for providing a net part-turn component of series excitation to said main pole pieces.

HARRY S. PAGE.